(12) United States Patent
Terai

(10) Patent No.: US 10,948,077 B2
(45) Date of Patent: Mar. 16, 2021

(54) TRANSMISSION, CONTROL APPARATUS OF TRANSMISSION, AND METHOD OF CONTROLLING TRANSMISSION

(71) Applicant: SUBARU CORPORATION, Tokyo (JP)

(72) Inventor: Koichiro Terai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 180 days.

(21) Appl. No.: 16/241,541

(22) Filed: Jan. 7, 2019

(65) Prior Publication Data

US 2019/0277398 A1    Sep. 12, 2019

(30) Foreign Application Priority Data

Mar. 7, 2018    (JP) .............................. JP2018-040916

(51) Int. Cl.
*F16H 61/12*    (2010.01)
*F16H 61/18*    (2006.01)

(52) U.S. Cl.
CPC ............. *F16H 61/12* (2013.01); *F16H 61/18* (2013.01); *F16H 2061/1208* (2013.01); *F16H 2061/1232* (2013.01); *F16H 2061/1284* (2013.01)

(58) Field of Classification Search
CPC ............. F16H 61/12; F16H 2061/1284; F16H 2061/1224; F16H 2061/1232; F16H 2061/1208
See application file for complete search history.

(56) References Cited

U.S. PATENT DOCUMENTS

| 4,393,732 A | * | 7/1983 | Suzuki | .................... F16H 61/12 |
| | | | | 477/125 |
| 4,967,620 A | * | 11/1990 | Shimanaka | ......... F16H 61/0437 |
| | | | | 477/155 |
| 5,142,945 A | * | 9/1992 | Shimanaka | ......... F16H 61/0437 |
| | | | | 477/154 |

(Continued)

FOREIGN PATENT DOCUMENTS

| JP | 2005-195042 A | 7/2005 |
| JP | 2007-71272 A | 3/2007 |

OTHER PUBLICATIONS

Notification of reason(s) for refusal issued in corresponding Japanese Patent Application No. 2018-040916 dated Aug. 13, 2019.

*Primary Examiner* — Sherry L Estremsky
(74) *Attorney, Agent, or Firm* — Troutman Pepper Hamilton Sanders LLP

(57) ABSTRACT

A control apparatus of a transmission includes a hydraulic pressure circuit, an abnormality detector, and a controller. The transmission performs shifting operation of the transmission. The controller controls the shifting operation by controlling, as a first control operation, a control pressure adjusting value to allow a line pressure and a control pressure to have a correlation with each other and by using, as a value of the line pressure, a value calculated on a basis of a detected value of the control pressure. The controller controls the shifting operation by controlling, as a second control operation, the control pressure adjusting valve to allow the line pressure and the control pressure to have a correlation with each other and by using, as a value of the control pressure, a value calculated on a basis of a detected value of the line pressure.

18 Claims, 5 Drawing Sheets

(56) References Cited

U.S. PATENT DOCUMENTS

| | | | |
|---|---|---|---|
| 7,169,070 B2* | 1/2007 | Jozaki | F16H 61/12 |
| | | | 474/18 |
| 8,731,792 B2* | 5/2014 | Zhang | F16H 61/688 |
| | | | 701/63 |
| 10,738,883 B2* | 8/2020 | Suzumura | F16H 9/18 |
| 2018/0080548 A1* | 3/2018 | Ozono | F16H 61/12 |

* cited by examiner

TRANSMISSION, CONTROL APPARATUS OF TRANSMISSION, AND METHOD OF CONTROLLING TRANSMISSION

CROSS-REFERENCE TO RELATED APPLICATIONS

The present application claims priority from Japanese Patent Application No. 2018-040916 filed on Mar. 7, 2018, the entire contents of which are hereby incorporated by reference.

BACKGROUND

The technology relates to a transmission to be mounted in a power feeding system of a structure such as a vehicle, a control apparatus of the transmission, and a method of controlling the transmission.

In a transmission to be mounted in a structure such as a vehicle, a control unit of the vehicle calculates a target shifting ratio on the basis of factors including a throttle position and a vehicle traveling speed. In the transmission, shifting operation of the vehicle is so performed by means of, for example, a hydraulic pressure as to cause a shifting ratio of the vehicle to come close to the target shifting ratio. For example, reference is made to Japanese Unexamined Patent Application Publication No. 2007-71272.

SUMMARY

An aspect of the technology provides a control apparatus of a transmission. The transmission includes a hydraulic pressure unit. The transmission is configured to perform shifting operation by using a control pressure derived from an actuating oil to be supplied to the hydraulic pressure unit. The control apparatus is configured to control the transmission. The control apparatus includes: a hydraulic pressure circuit including a line pressure adjusting valve, a control pressure adjusting valve, a line pressure sensor, and a control pressure sensor, in which the line pressure adjusting valve is configured to adjust a line pressure derived from the actuating oil that is to be supplied from a hydraulic pressure supply source, the control pressure adjusting valve is configured to adjust the control pressure that is derived from the actuating oil and that is to be applied to the hydraulic pressure unit, the line pressure sensor is configured to detect the line pressure, and the control pressure sensor is configured to detect the control pressure; an abnormality detector configured to detect an abnormality of the line pressure sensor and an abnormality of the control pressure sensor; and a controller configured to perform first control operation, second control operation, or both, in which the first control operation is performed when the abnormality of the line pressure sensor is detected, and the second control operation is performed when the abnormality of the control pressure sensor is detected. The control pressure adjusting valve is provided in an oil path that couples the line pressure adjusting valve and the hydraulic pressure unit to each other. The actuating oil that has flowed from the line pressure adjusting valve being supplied to the hydraulic pressure unit via the control pressure adjusting valve. The controller is configured to control the shifting operation of the transmission by controlling, as the first control operation, the control pressure adjusting value to allow the line pressure and the control pressure to have a correlation with each other and by using, as a value of the line pressure, a value calculated on a basis of a detected value of the control pressure detected by the control pressure sensor. The controller is configured to control the shifting operation of the transmission by controlling, as the second control operation, the control pressure adjusting valve to allow the line pressure and the control pressure to have a correlation with each other and by using, as a value of the control pressure, a value calculated on a basis of a detected value of the line pressure detected by the line pressure sensor.

An aspect of the technology provides a transmission including: a transmission unit including a hydraulic pressure unit, in which the transmission unit is configured to perform shifting operation by using a control pressure derived from an actuating oil to be supplied to the hydraulic pressure unit; a hydraulic pressure circuit including a line pressure adjusting valve, a control pressure adjusting valve, a line pressure sensor, and a control pressure sensor, in which the line pressure adjusting valve is configured to adjust a line pressure derived from the actuating oil that is to be supplied from a hydraulic pressure supply source, the control pressure adjusting valve is configured to adjust the control pressure that is derived from the actuating oil and that is to be applied to the hydraulic pressure unit, the line pressure sensor is configured to detect the line pressure, and the control pressure sensor is configured to detect the control pressure; an abnormality detector configured to detect an abnormality of the line pressure sensor and an abnormality of the control pressure sensor; and a controller configured to perform first control operation, second control operation, or both, in which the first control operation is performed when the abnormality of the line pressure sensor is detected, and the second control operation is performed when the abnormality of the control pressure sensor is detected. The control pressure adjusting valve is provided in an oil path that couples the line pressure adjusting valve and the hydraulic pressure unit to each other. The actuating oil that has flowed from the line pressure adjusting valve is supplied to the hydraulic pressure unit via the control pressure adjusting valve. The controller is configured to control the shifting operation of the transmission unit by controlling, as the first control operation, the control pressure adjusting value to allow the line pressure and the control pressure to have a correlation with each other and by using, as a value of the line pressure, a value calculated on a basis of a detected value of the control pressure detected by the control pressure sensor. The controller is configured to control the shifting operation of the transmission unit by controlling, as the second control operation, the control pressure adjusting valve to allow the line pressure and the control pressure to have a correlation with each other and by using, as a value of the control pressure, a value calculated on a basis of a detected value of the line pressure detected by the line pressure sensor.

An aspect of the technology provides a method of controlling a transmission. The transmission includes a hydraulic pressure unit. The transmission is configured to perform shifting operation by using a control pressure derived from an actuating oil. The actuating oil is supplied from a hydraulic pressure circuit to the hydraulic pressure unit. The method includes: detecting, by a control pressure sensor, the control pressure that is derived from the actuating oil and that is to be applied to the hydraulic pressure unit; detecting, by a line pressure sensor, a line pressure derived from the actuating oil in the hydraulic pressure circuit; determining whether an abnormality of the line pressure sensor occurs; determining whether an abnormality of the control pressure sensor occurs; performing first control operation, second control operation, or both, in which the first control operation is performed when the abnormality of the line pressure sensor is detected, the second control operation is performed when the abnormality of the control pressure sensor is detected; controlling the shifting operation of the transmission by controlling, as the first control operation, a control pressure adjusting value to allow the line pressure and the control pressure to have a correlation with each other and by using, as a value of the line pressure, a value calculated on a basis of a detected value of the control pressure detected by the control pressure sensor, in which the control pressure adjusting valve being configured to adjust the control pressure that is derived from the actuating oil and that is to be applied to the hydraulic pressure unit; and controlling the shifting operation of the transmission by controlling, as the second control operation, the control pressure adjusting valve to allow the line pressure and the control pressure to have a correlation with each other and by using, as a value of the control pressure, a value calculated on a basis of a detected value of the line pressure detected by the line pressure sensor.

DETAILED DESCRIPTION

Figure 1:
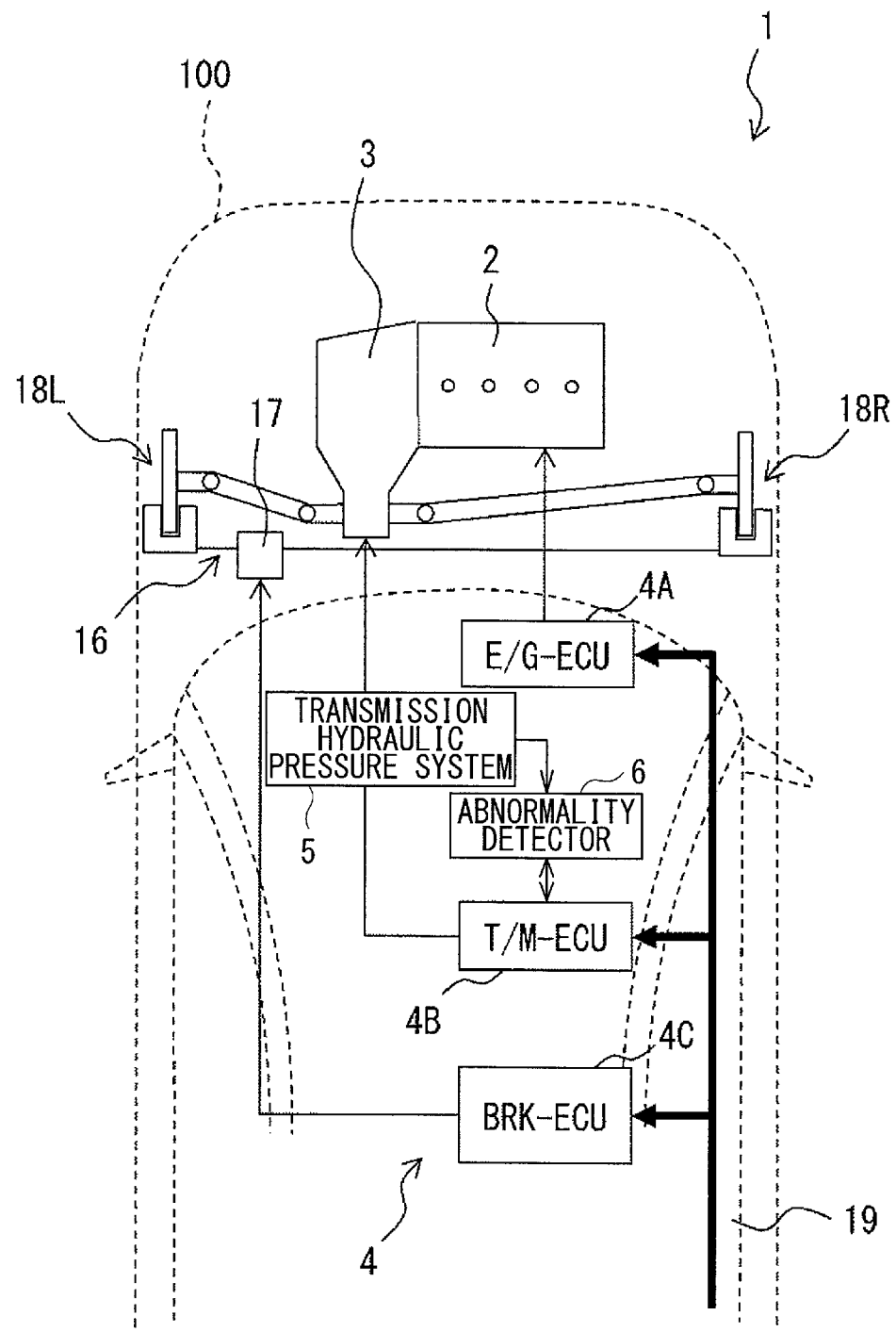
FIG. 1 is a schematic diagram illustrating a general configuration example of a vehicle including a continuously variable transmission and a control apparatus of the continuously variable transmission according to one implementation of the technology.

It is advantageous to control a hydraulic pressure by using a plurality of pressure sensors and a plurality of adjusting valves upon performing shifting operation in a transmission. Even when an error occurs in some of the pressure sensors, what is desired is that operation control of the transmission is able to be continued.

It is desirable to provide a transmission, a control apparatus of the transmission, and a method of controlling the transmission that are able to secure user safety and further improve user convenience.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

It is to be noted that the descriptions will be provided in the following example order.
1. Implementation (an example of a control apparatus of a continuously variable transmission configured to use another sensor upon detection of an abnormality of a sensor)
2. Modification Examples 1. Implementation

[Schematic Configuration of Vehicle 1]

Figure 2:
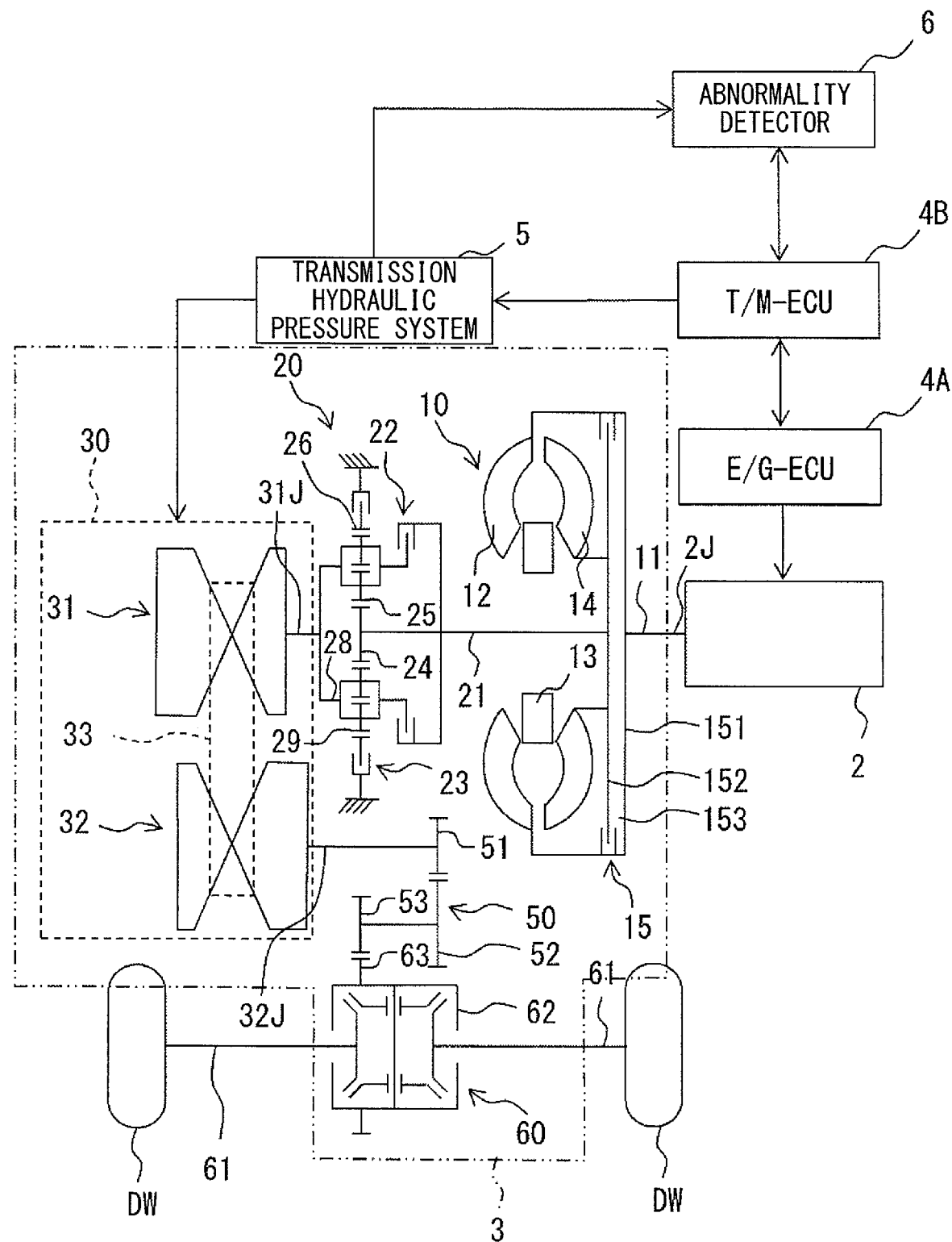
FIG. 2 is a schematic diagram illustrating a detailed configuration example of the continuously variable transmission and the control apparatus of the continuously variable transmission each illustrated in FIG. 1.
Figure 3:
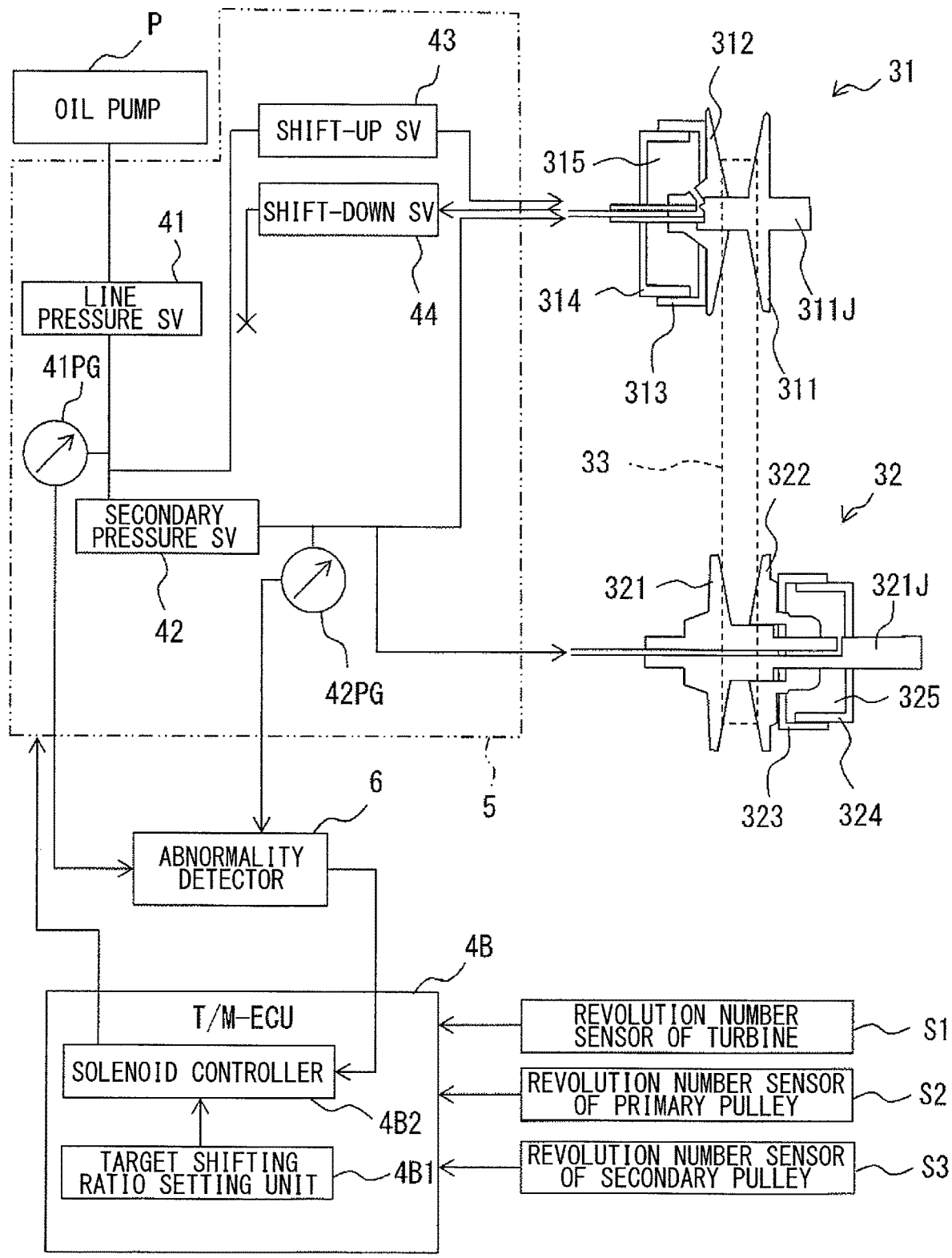
FIG. 3 is a schematic diagram illustrating a detailed configuration example of the continuously variable transmission unit and a transmission hydraulic pressure system each illustrated in FIG. 2.

FIG. 1 schematically illustrates a general configuration example of a vehicle 1 incorporating a continuously variable transmission 3 according to an example implementation of the technology. FIG. 2 is a schematic diagram illustrating a detailed configuration example of the continuously variable transmission 3 and a control unit 4 each illustrated in FIG. 1. FIG. 3 is a schematic diagram illustrating a detailed configuration example of a continuously variable transmission unit 30 and a transmission hydraulic pressure system 5 each illustrated in FIG. 2.

Referring to FIG. 1, the vehicle 1 may be provided with four drive wheels DW and a vehicle body 100. The vehicle 1 may include an engine 2, the continuously variable transmission 3, the control unit 4, the transmission hydraulic pressure system 5, and an abnormality detector 6, in the vehicle body 100. The engine 2 may be a power source. The continuously variable transmission 3 may feed, to the drive wheels DW, drive power derived from the engine 2. The vehicle 1 may further include a brake hydraulic system 16, a valve unit 17, and brakes 18L and 18R in the vehicle body 100. In one implementation, the continuously variable transmission 3 may serve as a "transmission". In one implementation, the control unit 4 may serve as a "controller". In one implementation, the transmission hydraulic pressure system 5 may serve as a "hydraulic pressure circuit". In one implementation, the abnormality detector 6 may serve as an "abnormality detector".

[Configuration of Engine 2]

The engine 2 may be an internal combustion engine that outputs mechanical energy (e.g., drive power) by combusting fuel such as gasoline. The engine 2 may be, for example, a piston reciprocating engine in which at least one piston moves backward and forward in a corresponding cylinder. The engine 2 may be provided with components including a fuel injection device, an ignition device, and a throttle valve device. The engine 2 may be controlled by an engine control unit (i.e., E/G-ECU) 4A in the control unit 4. The drive power generated by the engine 2 may be outputted from an output shaft 2J illustrated in FIG. 2. The generated drive power may be inputted to the continuously variable transmission 3. The continuously variable transmission 3 may be coupled to the engine 2.

[Configuration of Continuously Variable Transmission 3]

Referring to FIG. 2, the continuously variable transmission 3 may include, for example, a torque converter 10, a forward reverse switching mechanism 20, the continuously variable transmission unit 30, a deceleration unit 50, and a differential 60.

[Torque Converter 10]

The torque converter 10 may be, for example, a fluid feeding unit. The fluid feeding unit may feed the drive power derived from the engine 2 to the forward reverse switching mechanism 20 by means of an actuating oil. The forward reverse switching mechanism 20 may be located downstream of the torque converter 10. The actuating oil may include, for example, an automatic transmission fluid (ATF). The fluid feeding unit may increase torque of the drive power. Referring to FIG. 2, the torque converter 10 may include an input shaft 11, three types of impellers including a pump impeller 12, a stator 13, and a turbine runner 14, and a lockup clutch 15.

The pump impeller 12, the stator 13, and the turbine runner 14 may each revolve coaxially around the input shaft 11. The input shaft 11 may be provided at a predetermined location in the torque converter 10. The predetermined location in the torque converter 10 may face the engine 2. The input shaft 11 may be coupled to the output shaft 2J of the engine 2, causing the input shaft 11 and the output shaft 2J to integrally revolve. The pump impeller 12 may be coupled to the input shaft 11, causing the pump impeller 12 and the input shaft 11 to integrally revolve. In contrast, referring to FIG. 2, the turbine runner 14 may be coupled to an input shaft 21 of the forward reverse switching mechanism 20. The input shaft 21 will be described later. Further, the stator 13 may be engageable with a static member out of components configuring the continuously variable transmission 3. The static member may include, for example, a housing of the continuously variable transmission 3. Further, the pump impeller 12 and the turbine runner 14 may be sealed therebetween with the actuating oil.

The torque converter 10 may feed, to the turbine runner 14, the drive power that is derived from the engine 2 and is to be fed to the pump impeller 12. During the feeding, the torque converter 10 may increase the torque of the drive power by means of the actuating oil. The revolution of the pump impeller 12 may cause the actuating oil to move from the pump impeller 12 to the turbine runner 14, following which the actuating oil may return to the pump impeller 12 again. At this occasion, in other words, upon the actuating oil that has moved to the turbine runner 14 returning from the turbine runner 14 to the pump impeller 12, the stator 13 may change a flow direction of the actuating oil to a direction along the revolutions of the pump impeller 12 and the turbine runner 14. This makes it possible, in the torque converter 10, to increase the torque to be fed from the pump impeller 12 to the turbine runner 14.

The lockup clutch 15 may couple the pump impeller 12 and the turbine runner 14 to each other. In an example implementation, the lockup clutch 15 may include a revolution member 151 and a revolution member 152. The revolution member 151 may be coupled to the input shaft 11. The revolution member 152 may be coupled to the input shaft 21 of the forward reverse switching mechanism 20. The revolution member 151 and the revolution member 152 may be disposed to face each other. When the lockup clutch 15 is in a coupled state, the application of a hydraulic pressure derived from the actuating oil may cause the revolution member 151 and the revolution member 152 to be biased and brought into contact with each other by means of a predetermined clutch pressure, allowing for a synchronous revolution. An oil chamber 153 sealed with the actuating oil may be disposed between the revolution member 151 and the revolution member 152. At this occasion, the pump impeller 12 and the turbine runner 14 may become coupled directly to each other, causing the drive power derived from the engine 2 to be directly fed from the turbine runner 14 to the forward reverse switching mechanism 20. When the lockup clutch 15 is in the coupled state, the E/G-ECU 4A may keep output torque of the output shaft 2J to such a level that a slip occurring on a contact surface between the revolution member 151 and the revolution member 152 is avoided or suppressed, even when an error occurs. The error will be described later.

The revolution number of the turbine runner 14 (i.e., turbine revolution number) may be detected by a revolution number sensor of turbine S1 illustrated in FIG. 3. The turbine revolution number detected by the revolution number sensor of turbine S1 may be outputted to the transmission control unit (T/M-ECU) 4B. The transmission control unit (T/M-ECU) 4B will be described in detail later.

[Forward Reverse Switching Mechanism 20]

The forward reverse switching mechanism 20 may include a gear such as a double pinion planetary gear or a dual planetary gear. The forward reverse switching mechanism 20 may include, for example, the input shaft 21, a sun gear 24, an inner planetary pinion 25, an outer planetary pinion 26, a planetary carrier 28, and a ring gear 29. The input shaft 21 may be coupled to the turbine runner 14 of the torque converter 10. The sun gear 24 may be coupled to the input shaft 21. The sun gear 24 may be in mesh with the inner planetary pinion 25. The outer planetary pinion 26 may be in mesh with the inner planetary pinion 25. The planetary carrier 28 may rotatably support the inner planetary pinion 25 and the outer planetary pinion 26. The ring gear 29 may be in mesh with the outer planetary pinion 26. The planetary carrier 28 may be coupled to an input shaft 31J of the continuously variable transmission unit 30. The input shaft 31J of the continuously variable transmission unit 30 may be referred to as a transmission unit input shaft. The continuously variable transmission unit 30 will be described later.

The forward reverse switching mechanism 20 may further include a forward clutch 22 and a reverse brake 23. The forward clutch 22 may couple the sun gear 24 with the planetary carrier 28. The reverse brake 23 may control the revolution of the ring gear 29. In the forward reverse switching mechanism 20, the forward clutch 22 may be operated into a coupled state, and further, the reverse brake 23 may be operated into a released state. These two operations may cause all of the sun gear 24, the planetary carrier 28, and the ring gear 29 to integrally revolve. This enables the forward reverse switching mechanism 20 to feed, to the transmission unit input shaft 31J, the drive power that is derived from the engine 2 and thereafter received at the input shaft 21. The forward reverse switching mechanism 20 may perform this feeding of the drive power without causing the revolution direction and the revolution speed of the drive power to change. In contrast, the forward clutch 22 may be operated into the released state, and further, the reverse brake 23 may be operated into a stopped state. These two operations may cause the planetary carrier 28 to revolve in the opposite direction to the revolution direction of the sun gear 24. This enables the forward reverse switching mechanism 20 to reverse the revolution direction of the drive power that is derived from the engine 2, to thereby make it possible to feed the drive power to the transmission unit input shaft 31J. The drive power derived from the engine 2 may be received at the input shaft 21. Further, both the forward clutch 22 and the reverse brake 23 may be operated into the released state. This may cause the feeding of the drive power between the sun gear 24 and the planetary carrier 28 to be cut off. In an example implementation, the control unit 4 may so cooperate with the forward reverse switching mechanism 20 as to control the states of the forward clutch 22 and the states of the reverse brake 23. The states of the forward clutch 22 may include, for example, the coupled state and the released state. The states of the reverse brake 23 may include, for example, the stopped state and a non-operating state.

[Continuously Variable Transmission Unit 30]

The continuously variable transmission unit 30 may be a CVT that makes it possible to continuously vary a shifting ratio. The continuously variable transmission unit 30 may include the transmission unit input shaft 31J, a primary pulley 31, a transmission unit output shaft 32J, a secondary pulley 32, and a chain 33. The transmission unit input shaft 31J may be coupled to the planetary carrier 28. The transmission unit input shaft 31J may receive the drive power derived from the output shaft 2J via the forward reverse switching mechanism 20. The primary pulley 31 may be provided coaxially with the transmission unit input shaft 31J. The primary pulley 31 may revolve synchronously with the transmission unit input shaft 31J by means of the drive power derived from the engine 2. The transmission unit output shaft 32J may be provided in parallel with the transmission unit input shaft 31J. The transmission unit output shaft 32J may be so provided as to be spaced with a predetermined interval from the transmission unit input shaft 31J. The transmission unit output shaft 32J may output the drive power to the deceleration unit 50. The secondary pulley 32 may be provided coaxially with the transmission unit output shaft 32J. The secondary pulley 32 may revolve synchronously with the transmission unit output shaft 32J. The chain 33 may be a power feeding member that is wound on both the primary pulley 31 and the secondary pulley 32. The chain 33 may feed the drive power derived from the transmission unit input shaft 31J to the transmission unit output shaft 32J. In an example implementation, a metal belt may be used for the power feeding member, in place of the chain 33.

The continuously variable transmission unit 30 may perform its operation when the hydraulic pressure is supplied from the transmission hydraulic pressure system 5 to the continuously variable transmission unit 30. The continuously variable transmission unit 30 may vary a pulley width of the primary pulley 31, to thereby make it possible to vary a winding diameter of the chain 33 that is wound on the primary pulley 31. Further, the continuously variable transmission unit 30 may vary a pulley width of the secondary pulley 32, to thereby make it possible to vary the winding diameter of the chain 33 that is wound on the secondary pulley 32. Under the control performed by the T/M-ECU 4B, the continuously variable transmission unit 30 may vary the pulley width of the primary pulley 31, to thereby cause the winding diameter of the chain 33 on the primary pulley 31 to change, and similarly, may vary the pulley width of the secondary pulley 32, to thereby cause the winding diameter of the chain 33 on the secondary pulley 32 to change. The ratio of a winding diameter Ro of the chain 33 on the secondary pulley 32 to a winding diameter Ri of the chain 33 on the primary pulley 31 (Ro/Ri) may be a shifting ratio that is a ratio of the revolution speed Ni of the transmission unit input shaft 31J to the revolution speed No of the transmission unit output shaft 32J (Ni/No). The continuously variable transmission unit 30 may continuously vary at least one of the pulley width of the primary pulley 31 and the pulley width of the secondary pulley 32, to thereby make it possible to continuously vary the shifting ratio (Ni/No).

The continuously variable transmission unit 30 may vary the revolution speed of the drive power (i.e., torque) received by the transmission unit input shaft 31J. This variation of the torque may be controlled by means of both the primary pulley 31 and the secondary pulley 32. The resultant drive power may be fed from the transmission unit output shaft 32J to the deceleration unit 50. The number of revolutions of the primary pulley 31 (i.e., the primary pulley revolution number) may be detected by a revolution number sensor of primary pulley S2, as illustrated in FIG. 3. The number of revolutions of the secondary pulley 32 (i.e., the secondary pulley revolution number) may be detected by a revolution number sensor of secondary pulley S3, as illustrated in FIG. 3. Both the number of revolutions of the primary pulley and the number of revolutions of the secondary pulley each detected by the corresponding sensor may be outputted to the transmission control unit (T/M-ECU) 4B.

Referring to FIG. 3, a detailed description will be given of the configuration of the primary pulley 31 and the configuration of the secondary pulley 32 in the continuously variable transmission unit 30.

As illustrated in FIG. 3, the primary pulley 31 may include a fixed sheave 311 and a movable sheave 312. The fixed sheave 311 may be integrally formed with a primary shaft 311J that is fixed to the transmission unit input shaft 31J. The movable sheave 312 may be so provided as to be movable toward the fixed sheave 311 along a direction in which the primary shaft 311J extends. The primary pulley 31 may include a plunger 314 that is coupled to the primary shaft 311J of the fixed sheave 311. The primary pulley 31 may also include a cylinder 313 that is coupled to the movable sheave 312. The cylinder 313 may be in slidable contact with an outer peripheral surface of the plunger 314. The primary pulley 31 may also include an oil chamber 315 that is disposed between the plunger 314 and the cylinder 313. The oil chamber 315 may be used for driving the movable sheave 312 in the axial direction of the primary shaft 311J by means of the hydraulic pressure.

In a similar manner to the primary pulley 31, the secondary pulley 32 may include a fixed sheave 321 and a movable sheave 322. The fixed sheave 321 may be integrally formed with a secondary shaft 321J that is fixed to the transmission unit output shaft 32J. The movable sheave 322 may be so provided as to be movable toward the fixed sheave 321 along a direction in which the secondary shaft 321J extends. The secondary pulley 32 may include a plunger 324 that is coupled to the secondary shaft 321J of the fixed sheave 321. The secondary pulley 32 may also include a cylinder 323 that is coupled to the movable sheave 322. The cylinder 323 may be in slidable contact with an outer peripheral surface of the plunger 324. The secondary pulley 32 may also include an oil chamber 325 that is disposed between the plunger 324 and the cylinder 323. The oil chamber 325 may be used for driving the movable sheave 322 in the axial direction of the secondary shaft 321J by means of the hydraulic pressure.

The oil chamber 315 of the primary pulley 31 and the oil chamber 325 of the secondary pulley 32 may be each supplied with the hydraulic pressure derived from the transmission hydraulic pressure system 5. The primary pulley 31 may have a groove width that is determined by a hydraulic pressure to be supplied to the oil chamber 315 (hereinafter, referred to as a primary pressure). The secondary pulley 32 may have a groove width that is determined by a hydraulic pressure to be supplied to the oil chamber 325 (hereinafter, referred to as a secondary pressure). The transmission hydraulic pressure system 5 may adjust both the primary pressure supplied to the oil chamber 315 and the secondary pressure supplied to the actuating oil chamber 325. In other words, the primary pressure may be a hydraulic pressure that is supplied to the primary pulley 31 as a hydraulic pressure unit in the continuously variable transmission unit 30. Similarly, the secondary pressure may be a hydraulic pressure that is supplied to the secondary pulley 32 as the hydraulic pressure unit in the continuously variable transmission unit 30. The hydraulic pressures including, for example, the primary pressure and the secondary pressure may be each adjusted by the transmission hydraulic pressure system 5 and each supplied to the corresponding hydraulic pressure unit. Such hydraulic pressures may be controlled by the control unit 4 in accordance with a driving state (e.g., a shifting ratio) of the vehicle 1.

[Deceleration Unit 50]

The deceleration unit 50 may include a drive gear 51, a driven gear 52, and a differential drive gear 53. The drive gear 51 may be coupled to the transmission unit output shaft 32J. The driven gear 52 may be in mesh with the drive gear 51. The differential drive gear 53 may be coupled to the driven gear 52. The differential drive gear 53 may be in mesh with a ring gear 63. The ring gear 63 may be fixed to a differential case 62 of the differential 60. The differential case 62 will be described later. The deceleration unit 50 may perform deceleration of the vehicle 1 to thereby increase torque of the drive power derived from the transmission unit output shaft 32J. Thereafter, the deceleration unit 50 may feed the resultant drive power to the differential 60.

[Differential 60]

The differential 60 may distribute and feed the resultant drive power derived from the deceleration unit 50 to each of left and right drive shafts 61. Each of the left and right drive shafts 61 may be coupled to corresponding one of the drive wheels DW. The drive power outputted from the output shaft 2J of the engine 2 may be fed to the drive wheels DW via the continuously variable transmission 3. The drive power fed to the drive wheels DW causes friction force between the drive wheels DW and a road surface on which the vehicle 1 is traveling, a result of which driving force to cause the vehicle 1 to travel is generated.

[Transmission Hydraulic Pressure System 5]

Referring to FIG. 3, the transmission hydraulic pressure system 5 may include a line pressure solenoid valve (SV) 41, a secondary pressure SV 42, a shift-up SV 43, and a shift-down SV 44. The line pressure SV 41 may adjust a line pressure. The line pressure may be an original pressure of an actuating oil to be supplied from an oil pump P. In one implementation, the oil pump P may serve as a "hydraulic pressure supply source". The line pressure SV 41 may be coupled to each of the secondary pressure SV 42, the shift-up SV 43, and the shift-down SV 44 in a parallel manner. Through the control performed by the solenoid valve controller 4B2, the line pressure SV 41, the secondary pressure SV 42, the shift-up SV 43, and the shift-down SV 44 may be each caused to perform opening-closing operation, to thereby cause the transmission hydraulic pressure system 5 to adjust an actuating oil pressure. The actuating oil pressure may be used for performing the shifting operation in the continuously variable transmission unit 30. The solenoid valve controller 4B2 illustrated in FIG. 3 will be described later. In one implementation, the line pressure SV41 may serve as a "line pressure adjusting valve". In one implementation, the secondary pressure SV42 may serve as a "control pressure adjusting valve".

The secondary pressure SV 42 may be provided in an oil path that couples the line pressure SV 41 and the secondary pulley 32 to each other. Further, an oil path running from the secondary pressure SV42 to the secondary pulley 32 may be coupled to an oil path running to the primary pulley 31. In other words, the secondary pressure SV 42 may be coupled to both the oil chamber 315 of the primary pulley 31 and the oil chamber 325 of the secondary pulley 32 by means of piping. Therefore, the actuating oil that has flowed from the line pressure SV 41 may be supplied, via the secondary pressure SV 42, to both the oil chamber 315 of the primary pulley 31 and the oil chamber 325 of the secondary pulley 32. The secondary pressure may be a hydraulic pressure to be supplied to the oil chamber 325. The secondary pressure may be adjusted by the secondary pressure SV 42. The transmission hydraulic pressure system 5 may include a line pressure sensor 41PG provided in the oil path (e.g., a pipe) connecting the line pressure SV 41 and the secondary pressure SV 42, to thereby detect the line pressure. The transmission hydraulic pressure system 5 may also include a secondary pressure sensor 42PG provided at a pipe running from the secondary pressure SV 42 to the secondary pulley 32, to thereby detect the secondary pressure. The detected value of the line pressure may be outputted from the line pressure sensor 41PG to the transmission control unit (T/M-ECU) 4B. The detected value of the secondary pressure may also be outputted from the secondary pressure sensor 42PG to the transmission control unit (T/M-ECU) 4B via the abnormality detector 6. In the transmission hydraulic pressure system 5, the line pressure and the secondary pressure may have a fixed correlation with each other when a position of the secondary pressure SV 42 is fixed. For example, the secondary pressure may be expressed by a mathematical function of the line pressure if the position of the secondary pressure SV 42 is fixed. In one implementation, the line pressure sensor 41PG may serve as a "line pressure sensor". In one implementation, the secondary pressure sensor 42PG may serve as a "control pressure sensor".

The shift-up SV 43 and the shift-down SV 44 may be each coupled to the oil chamber 315 of the primary pulley 31 by means of piping. Therefore, when the line pressure SV 41 and the shift-up SV 43 are each opened in a state of the shift-down SV 44 being closed, the actuating oil is supplied to the oil chamber 315. In such a case, the primary pressure increases, a result of which the movable sheave 312 moves close to the fixed sheave 311. This makes the groove width of the primary pulley 31 smaller. In contrast, when the line pressure SV 41 and the shift-down SV 44 are each opened in a state of the shift-up SV 43 being closed, the primary pressure decreases, a result of which the actuating oil is discharged from the oil chamber 315. In such a case, the movable sheave 312 moves away from the fixed sheave 311. This makes the groove width of the primary pulley 31 larger.

[Configuration of Control Unit 4]

As illustrated in FIG. 1, the control unit 4 may include the engine control unit (E/G-ECU) 4A, the transmission control unit (T/M-ECU) 4B, and a brake control unit (BRK-ECU) 4C. The E/G-ECU 4A, the T/M-ECU 4B, and the BRK-ECU 4C may be so coupled to one another as to perform communication mutually via a communication bus 19. Non-limiting examples of a communication network may include a controller area network (CAN) which is one of the standard protocols from the International Organization for Standardization (ISO). These units may configure a control system of the vehicle 1. Note that the coupling of the E/G-ECU 4A, the T/M-ECU 4B, and the BRK-ECU 4C is not limited to the configuration of the coupling with use of the communication bus 19. The coupling may be configured with use of, for example, wireless LAN.

The E/G-ECU 4A, the T/M-ECU 4B, and the BRK-ECU 4C may each include components including a microcontroller (e.g., a microprocessor), read-only memory (ROM), random access memory (RAM), backup RAM, and an input-output interface (I/F). The microcontroller may perform various arithmetic calculations. The ROM may store data such as programs that cause the microcontroller to execute various types of processing. The RAM may store various types of data such as arithmetic calculation results. The backup RAM may retain the stored data by means of, for example, a 12V battery.

In the control unit 4, various types of information may be shared via the communication bus 19. The various types of information may include, for example, detection signals that are inputted from various types of switches and various types of sensors to the E/G-ECU 4A, the T/M-ECU 4B, and the BRK-ECU 4C. The E/G-ECU 4A, for example, may output a control signal to components of the engine 2, to thereby control a factor such as engine output torque. The components of the engine 2 may include, for example, a throttle mechanism, a fuel injection mechanism, and an ignition mechanism. This causes the E/G-ECU 4A to perform output control of the engine 2. Note that a so-called revolution limit (i.e., rev. limit) may be normally preset in the engine 2. The rev. limit refers to an upper limit value of a permitted revolution speed of the output shaft 2J. When the revolution speed of the output shaft 2J in the engine 2 reaches a predetermined rev. limit, the E/G-ECU 4A may stop fuel from being supplied to a combustion chamber of the engine 2. The E/G-ECU 4A may obtain the revolution speed of the output shaft 2J as a control variable of the engine 2 by means of an engine revolution number sensor, for example.

The T/M-ECU 4B may output a control signal to the transmission hydraulic pressure system 5, to thereby adjust the actuating oil pressure in the transmission hydraulic pressure system 5. Through the adjustment of this actuating oil pressure, the T/M-ECU 4B may perform a shifting control of the continuously variable transmission 3. Further, the T/M-ECU 4B may request the E/G-ECU 4A to reduce engine output torque (i.e., torque down). Moreover, various types of information from various types of sensors may be inputted to the T/M-ECU 4B. The various types of sensors may include, for example, the revolution number sensor of turbine S1, the revolution number sensor of primary pulley S2, and the revolution number sensor of secondary pulley S3. The T/M-ECU 4B may further include a target shifting ratio setting unit 4B1 and a solenoid valve controller 4B2. Both the target shifting ratio setting unit 4B1 and the solenoid valve controller 4B2 may be operated on the microcontroller. The target shifting ratio setting unit 4B1 may set a target shifting ratio of the continuously variable transmission unit 30. The target shifting ratio may be set on the basis of driving information of the vehicle 1. The driving information of the vehicle 1 may include, for example, a position of an accelerator pedal and the secondary pulley revolution number. The E/G-ECU 4A may send information relating to the position of the accelerator pedal. The revolution number sensor of secondary pulley S3 may send information relating to the secondary pulley revolution number. The T/M-ECU 4B may so perform the shifting control as to cause an actual shifting ratio of the continuously variable transmission unit 30 to come close to a target shifting ratio that is set by the target shifting ratio setting unit 4B1. In an example implementation, the T/M-ECU 4B may adjust pressures on the basis of the control of the solenoid valve controller 4B2, to thereby cause the actual shifting ratio of the continuously variable transmission unit 30 to come close to the target shifting ratio that is set by the target shifting ratio setting unit 4B1. The pressures may include, for example, the line pressure, the primary pressure, and the secondary pressure, in the transmission hydraulic pressure system 5.

The T/M-ECU 4B controls the shifting operation of the continuously variable transmission 3 when the abnormality detector 6 has detected an abnormality of the line pressure sensor 41PG. This control by the T/M-ECU 4B is performed by using, as a value of the line pressure, a value of the secondary pressure to be detected by the secondary pressure sensor 42PG. Further, the T/M-ECU 4B controls the shifting operation of the continuously variable transmission 3 when the abnormality detector 6 has detected an abnormality of the secondary pressure sensor 42PG. This control by the T/M-ECU 4B is performed by using, as a value of the secondary pressure, a value of the line pressure to be detected by the line pressure sensor 41PG. At this occasion, the T/M-ECU 4B may fix the secondary pressure SV 42 at a fully opening position (i.e., 100%) or at a predetermined position (e.g., 70%) in each of situations when the abnormality detector 6 has detected the abnormality of the line pressure sensor 41PG and when the abnormality detector 6 has detected the abnormality of the secondary pressure sensor 42PG. As described previously, in the transmission hydraulic pressure system 5, the line pressure and the secondary pressure may have a fixed correlation with each other when the opening of the secondary pressure SV 42 is fixed. Further, the T/M-ECU 4B may stop the shifting operation of the continuously variable transmission 3 when both of the abnormality of the line pressure sensor 41PG and the abnormality of the secondary pressure sensor 42PG have been detected.

The BRK-ECU 4C may further output a control signal to the valve unit 17, to thereby adjust a brake hydraulic pressure of a brake hydraulic system 16. The brake hydraulic system 16 may be provided with the valve unit 17. Through the adjustment of the brake hydraulic pressure, the BRK-ECU 4C may so control braking force of each of the brakes 18L and 18R as to avoid, for example, wheel lock-up upon braking, and tire slip upon accelerating or turning.

[Configuration of Abnormality Detector 6]

The abnormality detector 6 detects the abnormality of the line pressure sensor 41PG and the abnormality of the secondary pressure sensor 42PG. The abnormality detector 6 may receive each of a value of the line pressure and a value of the secondary pressure. The value of the line pressure may be detected by the line pressure sensor 41PG. The value of the secondary pressure may be detected by the secondary pressure sensor 42PG. The abnormality detector 6 may detect the abnormality of the line pressure sensor 41PG on the basis of a difference between a command value of the line pressure and the detected value of the line pressure by the line pressure sensor 41PG. The command value of the line pressure may be supplied by the T/M-ECU 4B. Further, the abnormality detector 6 may detect the abnormality of the secondary pressure sensor 42PG on the basis of a difference between a command value of the secondary pressure and the detected value of the secondary pressure by the secondary pressure sensor 42PG. The command value of the line pressure may be supplied by the T/M-ECU 4B. At this occasion, the abnormality detector 6 may comprehensively determine reasonableness of each of the detected value of the line pressure and the detected value of the secondary pressure by considering factors including a traveling speed, a target shifting ratio, and an actual shifting ratio of the vehicle 1. Alternatively, the abnormality detector 6 may determine that the abnormality of the line pressure sensor 41PG or the abnormality of the secondary pressure sensor 42PG has occurred in a case where a predetermined state has continued for a certain period of time, for example. The predetermined state may include, for example, a state in which the value of the line pressure detected by the line pressure sensor 41PG or the value of the secondary pressure detected by the secondary pressure sensor 42PG keeps a minimum value even during driving of the vehicle 1.

[Operation Performed by Continuously Variable Transmission 3 and Control Unit 4]

Figure 4:
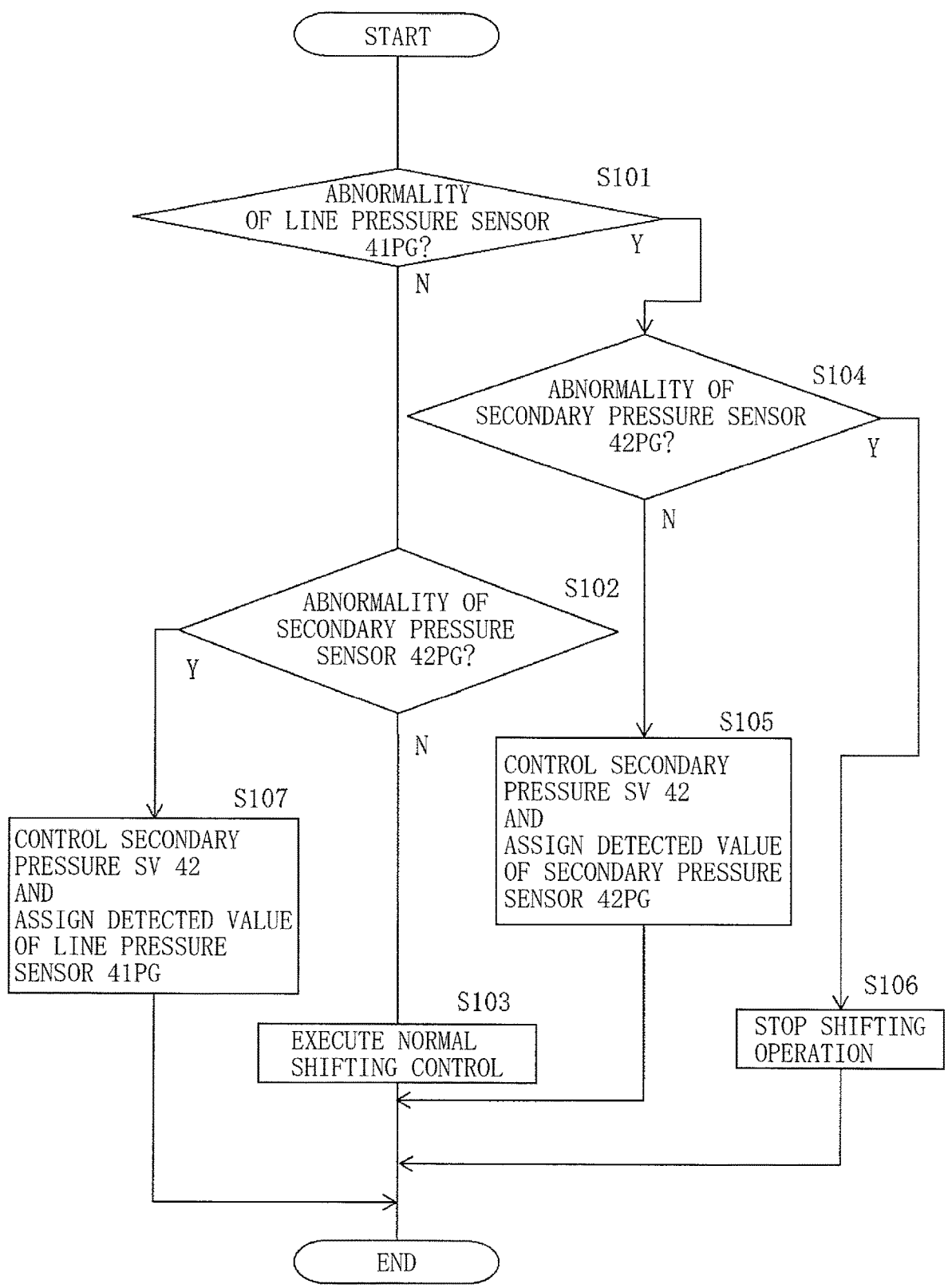
FIG. 4 is a flowchart illustrating an example of operation relating to an abnormality detection in the continuously variable transmission and the control apparatus each illustrated in FIG. 1.

Next, referring to FIG. 4, a description is given of operation in the continuously variable transmission 3 and the control unit 4. For example, a description is given of operation relating to an abnormality detection in the continuously variable transmission 3 and the control unit 4. FIG. 4 is a flowchart illustrating an example of operation relating to an abnormality detection in the continuously variable transmission 3 and the control unit 4. A sequence of the operation illustrated in FIG. 4 may be repetitively performed for each predetermined time in the continuously variable transmission 3 and the control unit 4.

First, in step S101, a determination may be made by the abnormality detector 6 as to whether an abnormality of the line pressure sensor 41PG occurs. In step S101, the determination may be made on the basis of the difference between a command value supplied by the T/M-ECU 4B and a detected value of the line pressure detected by the line pressure sensor 41PG. At this occasion in step S101, the abnormality detector 6 may comprehensively determine the reasonableness of the detected value of the line pressure by considering various types of information to be inputted to the T/M-ECU 4B.

When an abnormality of the line pressure sensor 41PG is undetected in step S101 (N in step S101), a determination may be made, in step S102, by the abnormality detector 6 as to whether an abnormality of the secondary pressure sensor 42PG occurs. In step S102, the determination may be made on the basis of the difference between a command value supplied by the T/M-ECU 4B and a detected value of the secondary pressure detected by the secondary pressure sensor 42PG. At this occasion in step S102, the abnormality detector 6 may comprehensively determine the reasonableness of the detected value of the secondary pressure by considering various types of information to be inputted to the T/M-ECU 4B.

When an abnormality of the secondary pressure sensor 42PG is undetected in step S102 (N in step S102), the transmission hydraulic pressure system 5 may execute, in step S103, normal shifting control of the continuously variable transmission unit 30 on the basis of the control of the solenoid valve controller 4B2. Thereafter, the sequence of the operation may end.

In contrast, when an abnormality of the line pressure sensor 41PG has been detected in step S101 (Y in step S101), similarly to step S102, a determination may be made, in step S104, by the abnormality detector 6 as to whether an abnormality of the secondary pressure sensor 42PG occurs. When an abnormality of the secondary pressure sensor 42PG is undetected in step S104 (N in step S104), the secondary pressure SV 42 is controlled to allow the line pressure and the secondary pressure to have a correlation with each other in step S105. For example, in step S105, the secondary pressure SV 42 may be fixed at a fully opening position (i.e., 100%) or at a predetermined position (e.g., 70%). In step S105, after the fixing of the secondary pressure SV 42, the secondary pressure sensor 42PG may be used in place of the line pressure sensor 41PG. In other words, in step S105, the shifting operation of the continuously variable transmission 3 is controlled by using, as a value of the line pressure, a value calculated on the basis of a value of the secondary pressure that has been detected by the secondary pressure sensor 42PG. Thereafter, the sequence of the operation may end. In contrast, when an abnormality of the line pressure sensor 41PG has been detected in step S101, and further, an abnormality of the secondary pressure sensor 42PG has been detected in step S104 (Y in step S104), the shifting operation of the continuously variable transmission 3 is stopped in step S106. Thereafter, the sequence of the operation may end.

When an abnormality of the secondary pressure sensor 42PG has been detected in step S102 (Y in step S102), the secondary pressure SV 42 is controlled to allow the line pressure and the secondary pressure to have a correlation with each other in step S107. For example, in step S107, the secondary pressure SV 42 may be fixed at a fully opening position (i.e., 100%) or at a predetermined position (e.g., 70%). In step S107, after the fixing of the secondary pressure SV 42, the line pressure sensor 41PG may be used in place of the secondary pressure sensor 42PG. In other words, in step S107, the shifting operation of the continuously variable transmission 3 is controlled by using, as a value of the secondary pressure, a value calculated on the basis of a value of the line pressure that has been detected by the line pressure sensor 41PG. Thereafter, the sequence of the operation may end.

[Workings and Effects]

In an example implementation as described above, the control unit 4 controls the shifting operation of the continuously variable transmission 3 by using the secondary pressure sensor 42PG when an abnormality of the line pressure sensor 41PG has been detected. Further, the control unit 4 controls the shifting operation of the continuously variable transmission 3 by using the line pressure sensor 41PG when an abnormality of the secondary pressure sensor 42PG has been detected. In other words, the line pressure and the secondary pressure are not controlled independently from each other but controlled together by means of a single pressure sensor, upon abnormality detection. This makes it possible to continue the control of the secondary pressure applied to the secondary pulley 32 even when one of the line pressure sensor 41PG and the secondary pressure sensor 42PG has an error. The secondary pulley 32 may be, for example, a hydraulic pressure unit. Hence, it is possible to continue the performance of the shifting operation of the continuously variable transmission 3 even after the occurrence of the error of the line pressure sensor 41PG or the secondary pressure sensor 42PG, allowing for smooth driving of the vehicle 1. According to the control apparatus of the continuously variable transmission 3 and the method of controlling the continuously variable transmission 3 in an example implementation of the technology, it is possible to secure user safety and further improve user convenience even upon an occurrence of an abnormality.

In an example implementation as described above, the control unit 4 may stop the shifting operation of the continuously variable transmission 3 when both of the abnormality of the line pressure sensor 41PG and the abnormality of the secondary pressure sensor 42PG have been detected. Therefore, it is possible to avoid unintentional sudden shifting operation. Such unintentional sudden shifting operation may occur on the basis of an unreasonable detected value of the line pressure detected by the line pressure sensor 41PG or an unreasonable detected value of the secondary pressure detected by the secondary pressure sensor 42PG. Hence, it is possible to further improve the safety on operation of the continuously variable transmission 3.

2. Modification Examples

Although the technology is described hereinabove with reference to the example implementations, the technology is not limited to the example implementations, and may be modified in wide variety of ways.

For example, an example implementation described above may be applied to a chain-type continuously variable transmission with use of the chain 33 or a belt-type continuously variable transmission with use of a belt. However, the technology is not limited the example implementation. For example, an alternative example implementation of the technology may be applied to a toroidal-type continuously variable transmission or another type of continuously variable transmission.

Further, the E/G-ECU 4A and the T/M-ECU 4B in an example implementation described above may be each configured by discrete hardware, or may be configured by integrated hardware.

Further, in the transmission hydraulic pressure system 5 in an example implementation described above, the secondary pressure sensor 42PG is exemplified as a control pressure sensor, and further, the secondary pressure is exemplified as a control pressure. However, the hydraulic pressure circuit of an example implementation described above is not limited thereto. For example, referring to FIG. 5, a plurality of hydraulic pressure units may be provided in a transmission hydraulic pressure system 5A according to a modification example. In the modification example, any of a plurality of control pressures each derived from corresponding one of actuating oils may be used as a line pressure when an abnormality of a line pressure sensor has been detected. The plurality of control pressures may be each supplied to corresponding one of the plurality of the hydraulic pressure units. In such a modification example, the plurality of control pressures each have a normal value (i.e., have reasonableness), and further, each of the plurality of control pressures has a correlation with the line pressure.

Figure 5:
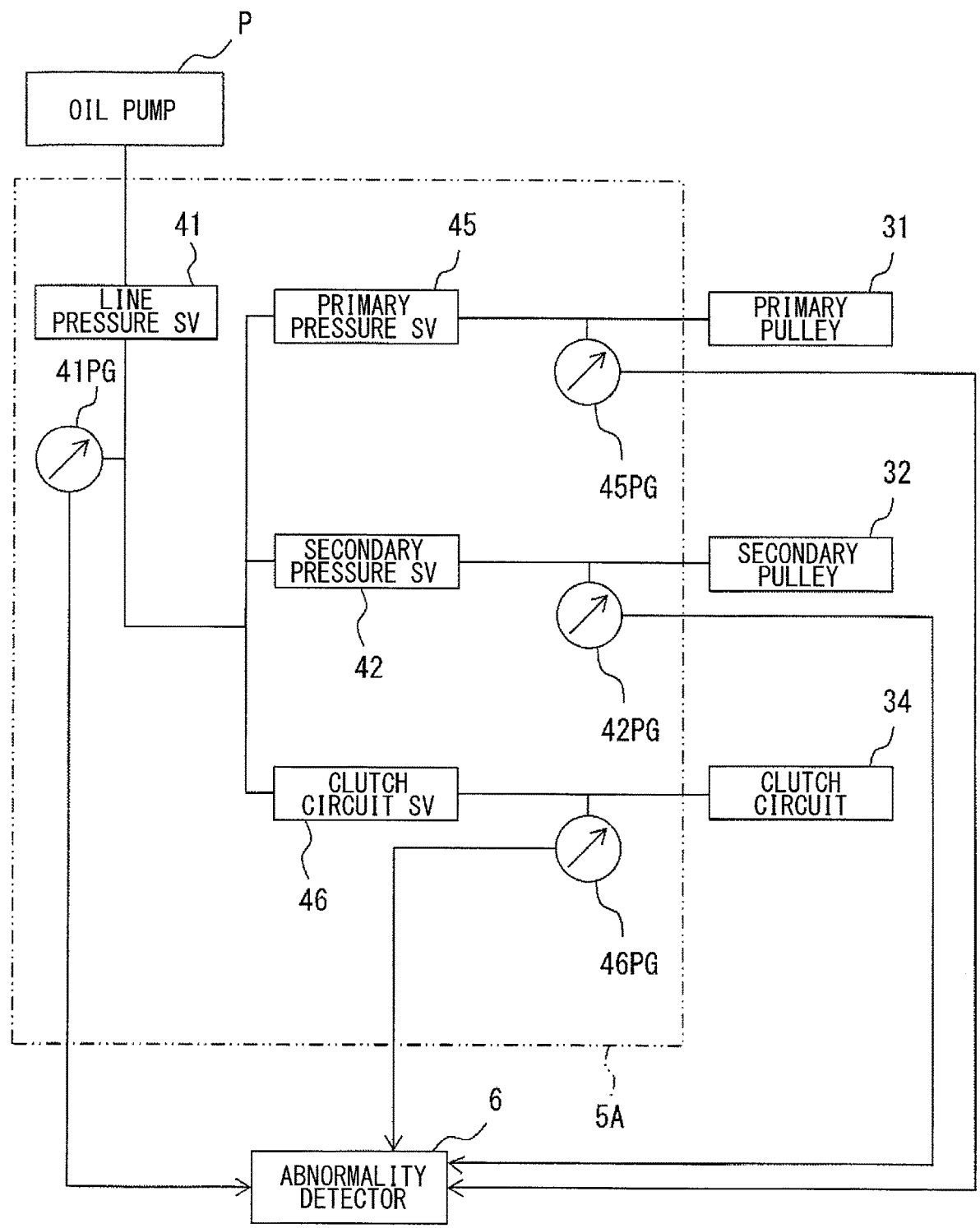
FIG. 5 is a schematic diagram illustrating a detailed configuration example of a continuously variable transmission unit and a transmission hydraulic pressure system according to a modification example.

In a modification example described above, the transmission hydraulic pressure system 5A illustrated in FIG. 5 may include, as the plurality of hydraulic pressure units, the line pressure SV 41, the line pressure sensor 41PG, the primary pulley 31, the secondary pulley 32, and a clutch circuit 34. The line pressure SV 41 may be coupled to each of the primary pulley 31, the secondary pulley 32, and the clutch circuit 34 in a parallel manner. The transmission hydraulic pressure system 5A may further include a primary pressure SV 45, the secondary pressure SV 42, and a clutch pressure SV 46. The primary pressure SV 45 may be disposed between the line pressure SV 41 and the primary pulley 31. The secondary pressure SV 42 may be disposed between the line pressure SV 41 and the secondary pulley 32. The clutch pressure SV 46 may be disposed between the line pressure SV 41 and the clutch circuit 34. The transmission hydraulic pressure system 5A may further include a primary pressure sensor 45PG, the secondary pressure sensor 42PG, and a clutch pressure sensor 46PG. The primary pressure sensor 45PG may be disposed between the primary pressure SV 45 and the primary pulley 31. The secondary pressure sensor 42PG may be disposed between the secondary pressure SV 42 and the secondary pulley 32. The clutch pressure sensor 46PG may be disposed between the clutch pressure SV 46 and the clutch circuit 34. The abnormality detector 6 may receive various detected values. The various detected values may include, for example, a detected value of the line pressure detected by the line pressure sensor 41PG, a detected value of the secondary pressure detected by the secondary pressure sensor 42PG, a detected value of a primary pressure detected by the primary pressure sensor 45PG, and a detected value of a clutch pressure detected by the clutch pressure sensor 46PG.

The abnormality detector 6 may also detect an abnormality of each of the line pressure sensor 41PG, the primary pressure sensor 45PG, the secondary pressure sensor 42PG, and the clutch pressure sensor 46PG when the vehicle 1 includes the transmission hydraulic pressure system 5A. The control unit 4 may use, as a value of the line pressure, at least a value from which an abnormality has been undetected, out of various values of pressures when an abnormality of the line pressure sensor 41PG provided in the transmission hydraulic pressure system 5A of the vehicle 1 has been detected, for example. The various values of pressures may include, for example, a value of the primary pressure detected by the primary pressure sensor 45PG, a value of the secondary pressure detected by the secondary pressure sensor 42PG, and a value of the clutch pressure detected by the clutch pressure sensor 46PG. At this occasion, the shifting operation of the continuously variable transmission 3 may be controlled by using, as a value of the line pressure, for example, a maximum value out of the value of the primary pressure, the value of the secondary pressure, and the value of the clutch pressure. Further, each of the values of the primary pressure, the secondary pressure, and the clutch pressure has a correlation with the value of the line pressure. Accordingly, the shifting operation of the continuously variable transmission 3 may be alternatively controlled by using, as a value of the line pressure, a value calculated by multiplying a value excluding the maximum value, out of the values of the primary pressure, the secondary pressure, and the clutch pressure, by a coefficient based on the correlation.

Further, in an example implementation and a modification example as describe above, some solenoid valves may be used. However, for the hydraulic pressure circuit in an alternative example implementation, a device such as a stepping motor may be used in place of the solenoid valve. Further, an oil path system of the hydraulic pressure circuit in an example implementation described above is not limited to the oil path system of the transmission hydraulic pressure system 5 illustrated in FIG. 3 according to an example implementation described above or the transmission hydraulic pressure system 5A illustrated in FIG. 5 according to a modification example described above. An alternative oil path system may be used. For example, in the transmission hydraulic pressure system 5 in an example implementation described above, the actuating oil may pass through the secondary pressure SV 42, and thereafter, may be supplied to both the oil chamber 315 of the primary pulley 31 and the oil chamber 325 of the secondary pulley 32. However, in the hydraulic pressure circuit of an alternative example implementation, the actuating oil may pass through the secondary pressure SV 42, and thereafter, may not be supplied to the oil chamber 315 of the primary pulley 31, but may only be supplied to the oil chamber 325 of the secondary pulley 32.

Further, the primary pulley 31 and the secondary pulley 32 are exemplified as the hydraulic pressure units of the continuously variable transmission unit 30 in an example implementation described above and a modification example described above. However, the hydraulic pressure units according to an example implementation described above is not limitative. The hydraulic pressure units may alternatively include, for example, a power roller, and an input and output discs in a traction drive transmission unit such as a toroidal continuously variable transmission.

Further, the continuously variable transmission 3 is exemplified in an example implementation described above. However, the transmission in an example implementation described above is not limitative. The transmission may alternatively include, for example, a multistage transmission such as a planetary gear transmission mechanism or a parallel shaft gear transmission mechanism.

Further, the sequence of the operation in an example implementation described above and a modification example described above may be performed by hardware (e.g., circuitry) or software (e.g., a program). In a case where the sequence of the operation is performed by software, the software may include a group of programs that causes a computer to execute each pieces of processing. Each of the programs may be incorporated into the computer in advance, or may be installed in the computer via a network or a storage medium.

Note that the effects described in an example implementation of the technology are merely exemplary effects, and thus not limited thereto. There may be another effects.

The T/M-ECU 4B illustrated in FIGS. 1, 2, and 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the T/M-ECU 4B. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the T/M-ECU 4B illustrated in FIGS. 1, 2, and 3.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A control apparatus of a transmission, the transmission including a hydraulic pressure unit, the transmission being configured to perform shifting operation by using a control pressure derived from an actuating oil to be supplied to the hydraulic pressure unit, the control apparatus being configured to control the transmission, the control apparatus comprising:

a hydraulic pressure circuit including a line pressure adjusting valve, a control pressure adjusting valve, a line pressure sensor, and a control pressure sensor, the line pressure adjusting valve being configured to adjust a line pressure derived from the actuating oil that is to be supplied from a hydraulic pressure supply source, the control pressure adjusting valve being configured to adjust the control pressure that is derived from the actuating oil and that is to be applied to the hydraulic pressure unit, the line pressure sensor being configured to detect the line pressure, the control pressure sensor being configured to detect the control pressure;

an abnormality detector configured to detect an abnormality of the line pressure sensor and an abnormality of the control pressure sensor; and a controller configured to perform first control operation, second control operation, or both, the first control operation being performed when the abnormality of the line pressure sensor is detected, the second control operation being performed when the abnormality of the control pressure sensor is detected, the control pressure adjusting valve being provided in an oil path that couples the line pressure adjusting valve and the hydraulic pressure unit to each other, the actuating oil that has flowed from the line pressure adjusting valve being supplied to the hydraulic pressure unit via the control pressure adjusting valve, the controller being configured to control the shifting operation of the transmission by controlling, as the first control operation, the control pressure adjusting valve to allow the line pressure and the control pressure to have a correlation with each other and by using, as a value of the line pressure, a value calculated on a basis of a detected value of the control pressure detected by the control pressure sensor, the controller being configured to control the shifting operation of the transmission by controlling, as the second control operation, the control pressure adjusting valve to allow the line pressure and the control pressure to have a correlation with each other and by using, as a value of the control pressure, a value calculated on a basis of a detected value of the line pressure detected by the line pressure sensor, wherein the controller allows the control pressure adjusting valve to be fixed at a predetermined position where the line pressure and the control pressure have a correlation with each other when the abnormality of the line pressure sensor is detected, or when the abnormality of the control pressure sensor is detected.

2. The control apparatus of the transmission according to claim 1, wherein the controller allows the control pressure adjusting valve to be fully open when the abnormality of the line pressure sensor is detected, or when the abnormality of the control pressure sensor is detected.

3. The control apparatus of the transmission according to claim 2, wherein the controller stops the shifting operation of the transmission when both of the abnormality of the line pressure sensor and the abnormality of the control pressure sensor have been detected.

4. The control apparatus of the transmission according to claim 3, wherein the hydraulic pressure unit comprises a plurality of hydraulic pressure units, the control pressure comprises a plurality of control pressures, the control pressure adjusting valve comprises a plurality of control pressure adjusting valves, and the control pressure sensor comprises a plurality of control pressure sensors, the transmission includes the plurality of hydraulic pressure units, the hydraulic pressure circuit includes the plurality of control pressure adjusting valves that are each configured to adjust corresponding one of the plurality of control pressures derived from the actuating oil that is to be supplied to each of the plurality of hydraulic pressure units, and the plurality of control pressure sensors that are each configured to detect corresponding one of the plurality of control pressures, the plurality of control pressures each having a correlation with the line pressure, and the controller controls the shifting operation of the transmission by using, as the value of the line pressure, a detected value derived from maximum one of the plurality of control pressures when the abnormality of the line pressure sensor is detected.

5. The control apparatus of the transmission according to claim 4, wherein the transmission includes a primary pulley, a secondary pulley, and a power feeding member, the primary pulley being configured to revolve by an output derived from a drive source, the secondary pulley being one of the hydraulic pressure units and being configured to revolve, the power feeding member causing the secondary pulley to revolve by feeding revolution power of the primary pulley to the secondary pulley.

6. The control apparatus of the transmission according to claim 3, wherein the transmission includes a primary pulley, a secondary pulley, and a power feeding member, the primary pulley being configured to revolve by an output derived from a drive source, the secondary pulley being the hydraulic pressure unit and being configured to revolve, the power feeding member causing the secondary pulley to revolve by feeding revolution power of the primary pulley to the secondary pulley.

7. The control apparatus of the transmission according to claim 2, wherein the hydraulic pressure unit comprises a plurality of hydraulic pressure units, the control pressure comprises a plurality of control pressures, the control pressure adjusting valve comprises a plurality of control pressure adjusting valves, and the control pressure sensor comprises a plurality of control pressure sensors, the transmission includes the plurality of hydraulic pressure units, the hydraulic pressure circuit includes the plurality of control pressure adjusting valves that are each configured to adjust corresponding one of the plurality of control pressures derived from the actuating oil that is to be supplied to each of the plurality of hydraulic pressure units, and the plurality of control pressure sensors that are each configured to detect corresponding one of the plurality of control pressures, the plurality of control pressures each having a correlation with the line pressure, and the controller controls the shifting operation of the transmission by using, as the value of the line pressure, a detected value derived from maximum one of the plurality of control pressures when the abnormality of the line pressure sensor is detected.

8. The control apparatus of the transmission according to claim 7, wherein the transmission includes a primary pulley, a secondary pulley, and a power feeding member, the primary pulley being configured to revolve by an output derived from a drive source, the secondary pulley being one of the hydraulic pressure units and being configured to revolve, the power feeding member causing the secondary pulley to revolve by feeding revolution power of the primary pulley to the secondary pulley.

9. The control apparatus of the transmission according to claim 2, wherein the transmission includes a primary pulley, a secondary pulley, and a power feeding member, the primary pulley being configured to revolve by an output derived from a drive source, the secondary pulley being the hydraulic pressure unit and being configured to revolve, the power feeding member causing the secondary pulley to revolve by feeding revolution power of the primary pulley to the secondary pulley.

10. The control apparatus of the transmission according to claim 1, wherein the controller stops the shifting operation of the transmission when both of the abnormality of the line pressure sensor and the abnormality of the control pressure sensor have been detected.

11. The control apparatus of the transmission according to claim 10, wherein the hydraulic pressure unit comprises a plurality of hydraulic pressure units, the control pressure comprises a plurality of control pressures, the control pressure adjusting valve comprises a plurality of control pressure adjusting valves, and the control pressure sensor comprises a plurality of control pressure sensors, the transmission includes the plurality of hydraulic pressure units, the hydraulic pressure circuit includes the plurality of control pressure adjusting valves that are each configured to adjust corresponding one of the plurality of control pressures derived from the actuating oil that is to be supplied to each of the plurality of hydraulic pressure units, and the plurality of control pressure sensors that are each configured to detect corresponding one of the plurality of control pressures, the plurality of control pressures each having a correlation with the line pressure, and the controller controls the shifting operation of the transmission by using, as the value of the line pressure, a detected value derived from maximum one of the plurality of control pressures when the abnormality of the line pressure sensor is detected.

12. The control apparatus of the transmission according to claim 11, wherein the transmission includes a primary pulley, a secondary pulley, and a power feeding member, the primary pulley being configured to revolve by an output derived from a drive source, the secondary pulley being one of the hydraulic pressure units and being configured to revolve, the power feeding member causing the secondary pulley to revolve by feeding revolution power of the primary pulley to the secondary pulley.

13. The control apparatus of the transmission according to claim 10, wherein the transmission includes a primary pulley, a secondary pulley, and a power feeding member, the primary pulley being configured to revolve by an output derived from a drive source, the secondary pulley being the hydraulic pressure unit and being configured to revolve, the power feeding member causing the secondary pulley to revolve by feeding revolution power of the primary pulley to the secondary pulley.

14. The control apparatus of the transmission according to claim 1, wherein the hydraulic pressure unit comprises a plurality of hydraulic pressure units, the control pressure comprises a plurality of control pressures, the control pressure adjusting valve comprises a plurality of control pressure adjusting valves, and the control pressure sensor comprises a plurality of control pressure sensors, the transmission includes the plurality of hydraulic pressure units, the hydraulic pressure circuit includes
the plurality of control pressure adjusting valves that are each configured to adjust corresponding one of the plurality of control pressures derived from the actuating oil that is to be supplied to each of the plurality of hydraulic pressure units, and
the plurality of control pressure sensors that are each configured to detect corresponding one of the plurality of control pressures, the plurality of control pressures each having a correlation with the line pressure, and
the controller controls the shifting operation of the transmission by using, as the value of the line pressure, a detected value derived from maximum one of the plurality of control pressures when the abnormality of the line pressure sensor is detected.

15. The control apparatus of the transmission according to claim 14, wherein the transmission includes a primary pulley, a secondary pulley, and a power feeding member, the primary pulley being configured to revolve by an output derived from a drive source, the secondary pulley being one of the hydraulic pressure units and being configured to revolve, the power feeding member causing the secondary pulley to revolve by feeding revolution power of the primary pulley to the secondary pulley.

16. The control apparatus of the transmission according to claim 1, wherein the transmission includes a primary pulley, a secondary pulley, and a power feeding member, the primary pulley being configured to revolve by an output derived from a drive source, the secondary pulley being the hydraulic pressure unit and being configured to revolve, the power feeding member causing the secondary pulley to revolve by feeding revolution power of the primary pulley to the secondary pulley.

17. A transmission comprising:
a transmission unit including a hydraulic pressure unit, the transmission unit being configured to perform shifting operation by using a control pressure derived from an actuating oil to be supplied to the hydraulic pressure unit;
a hydraulic pressure circuit including a line pressure adjusting valve, a control pressure adjusting valve, a line pressure sensor, and a control pressure sensor, the line pressure adjusting valve being configured to adjust a line pressure derived from the actuating oil that is to be supplied from a hydraulic pressure supply source, the control pressure adjusting valve being configured to adjust the control pressure that is derived from the actuating oil and that is to be applied to the hydraulic pressure unit, the line pressure sensor being configured to detect the line pressure, the control pressure sensor being configured to detect the control pressure;
an abnormality detector configured to detect an abnormality of the line pressure sensor and an abnormality of the control pressure sensor; and
a controller configured to perform first control operation, second control operation, or both, the first control operation being performed when the abnormality of the line pressure sensor is detected, the second control operation being performed when the abnormality of the control pressure sensor is detected,
the control pressure adjusting valve being provided in an oil path that couples the line pressure adjusting valve and the hydraulic pressure unit to each other,
the actuating oil that has flowed from the line pressure adjusting valve being supplied to the hydraulic pressure unit via the control pressure adjusting valve,
the controller being configured to control the shifting operation of the transmission unit by controlling, as the first control operation, the control pressure adjusting value to allow the line pressure and the control pressure to have a correlation with each other and by using, as a value of the line pressure, a value calculated on a basis of a detected value of the control pressure detected by the control pressure sensor,
the controller being configured to control the shifting operation of the transmission unit by controlling, as the second control operation, the control pressure adjusting valve to allow the line pressure and the control pressure to have a correlation with each other and by using, as a value of the control pressure, a value calculated on a basis of a detected value of the line pressure detected by the line pressure sensor,
wherein the controller allows the control pressure adjusting valve to be fixed at a predetermined position where the line pressure and the control pressure have a correlation with each other when the abnormality of the line pressure sensor is detected, or when the abnormality of the control pressure sensor is detected.

18. A method of controlling a transmission, the transmission including a hydraulic pressure unit, the transmission being configured to perform shifting operation by using a control pressure derived from an actuating oil, the actuating oil being supplied from a hydraulic pressure circuit to the hydraulic pressure unit, the method comprising:
detecting, by a control pressure sensor, the control pressure that is derived from the actuating oil and that is to be applied to the hydraulic pressure unit;
detecting, by a line pressure sensor, a line pressure derived from the actuating oil in the hydraulic pressure circuit;
determining whether an abnormality of the line pressure sensor occurs;
determining whether an abnormality of the control pressure sensor occurs;
performing first control operation, second control operation, or both, the first control operation being performed when the abnormality of the line pressure sensor is detected, the second control operation being performed when the abnormality of the control pressure sensor is detected;
controlling the shifting operation of the transmission by controlling, as the first control operation, a control pressure adjusting valve to allow the line pressure and the control pressure to have a correlation with each other and by using, as a value of the line pressure, a value calculated on a basis of a detected value of the control pressure detected by the control pressure sensor, the control pressure adjusting valve being configured to adjust the control pressure that is derived from the actuating oil and that is to be applied to the hydraulic pressure unit; and
controlling the shifting operation of the transmission by controlling, as the second control operation, the control pressure adjusting valve to allow the line pressure and the control pressure to have a correlation with each other and by using, as a value of the control pressure, a value calculated on a basis of a detected value of the line pressure detected by the line pressure sensor,
wherein the controller allows the control pressure adjusting valve to be fixed at a predetermined position where the line pressure and the control pressure have a correlation with each other when the abnormality of the line pressure sensor is detected, or when the abnormality of the control pressure sensor is detected.

* * * * *